United States Patent [19]
Tobin

[11] 3,822,674
[45] July 9, 1974

[54] BIRD FEEDER

[76] Inventor: Robert A. Tobin, 67 Lake Bluff Rd., Rochester, N.Y. 14622

[22] Filed: Mar. 21, 1973

[21] Appl. No.: 343,350

[52] U.S. Cl. .............................................. 119/53
[51] Int. Cl. .......................................... A01k 5/00
[58] Field of Search ..................... 119/52 R, 53, 51

[56] References Cited
UNITED STATES PATENTS

| | | | |
|---|---|---|---|
| 1,404,251 | 1/1922 | Westenberger et al. | 119/52 R |
| 2,475,207 | 7/1949 | Smith | 119/52 R |
| 2,667,858 | 2/1954 | Cussotti | 119/52 R |
| 2,891,508 | 6/1959 | Bower | 119/52 R X |
| 3,090,354 | 5/1963 | Merritt et al. | 119/52 R |
| 3,205,860 | 9/1965 | Moore | 119/52 R |
| 3,316,884 | 5/1967 | Viggars | 119/52 R |
| 3,648,661 | 3/1972 | Moore | 119/53 |

*Primary Examiner*—Robert Peshock
*Assistant Examiner*—J. N. Eskovitz
*Attorney, Agent, or Firm*—Cumpston, Shaw & Stephens

[57] ABSTRACT

A bird feeder has a spherical container suspended from a wire yoke for pivoting freely about a horizontal diameter, and a pipe and feeder table are secured to the bottom of this sphere. The pipe surrounds a bottom opening of the sphere, the feeder table is secured to the bottom of the pipe, and the pipe has bottom openings above the feeder table to dispense birdseed onto the feeder table. A rim around the feeder table retains the birdseed and serves as a perch, a deflector extends up into the bottom of the pipe to guide the birdseed through the bottom openings of the pipe, peck holes are drilled into the pipe wall to make small seeds accessable to small birds directly through the pipe wall, and a drip ring is secured around the underside of the sphere.

6 Claims, 4 Drawing Figures

BIRD FEEDER

THE INVENTIVE IMPROVEMENT

Bird feeders have attempted to combine characteristics appreciated by the birds and by the people who buy the feeders, and the optimum bird feeder is a complex combination of features including serviceability, reliability, aesthetic appeal, and economy of manufacture. The invention involves an appraisal of these and other features and aims at an improved bird feeder that is attractive, durable, squirrel proof, easy to fill and clean, impervious to weather, and economical to make.

SUMMARY OF THE INVENTION

The inventive bird feeder has a spherical, transparent plastic container for a supply of birdseed, and a support yoke formed of a wire bent into a U shape with the free ends of the wire inserted into diametricaly opposed openings in the container to support the container for pivoting freely about a generally horizontal axis between the wire ends. The container has a circular bottom opening for dispensing birdseed, and a downward extending, cylindrical plastic pipe is joined to the container around the bottom opening. A circular plastic feed table is secured to the bottom end of the pipe and extends radially outward around the pipe, and the bottom region of the pipe has openings above the feed table for dispensing birdseed onto the feed table. A raised rim around the periphery of the feed table contains the birdseed and serves as a perch. The invention also includes an effective method of making and assemblying such a bird feeder, and preferably includes a ring around the bottom of the pipe with openings corresponding to the pipe openings and rotationally adjustable for adjusting the effective size of the pipe openings.

DRAWINGS

DETAILED DESCRIPTION

Figure 1:
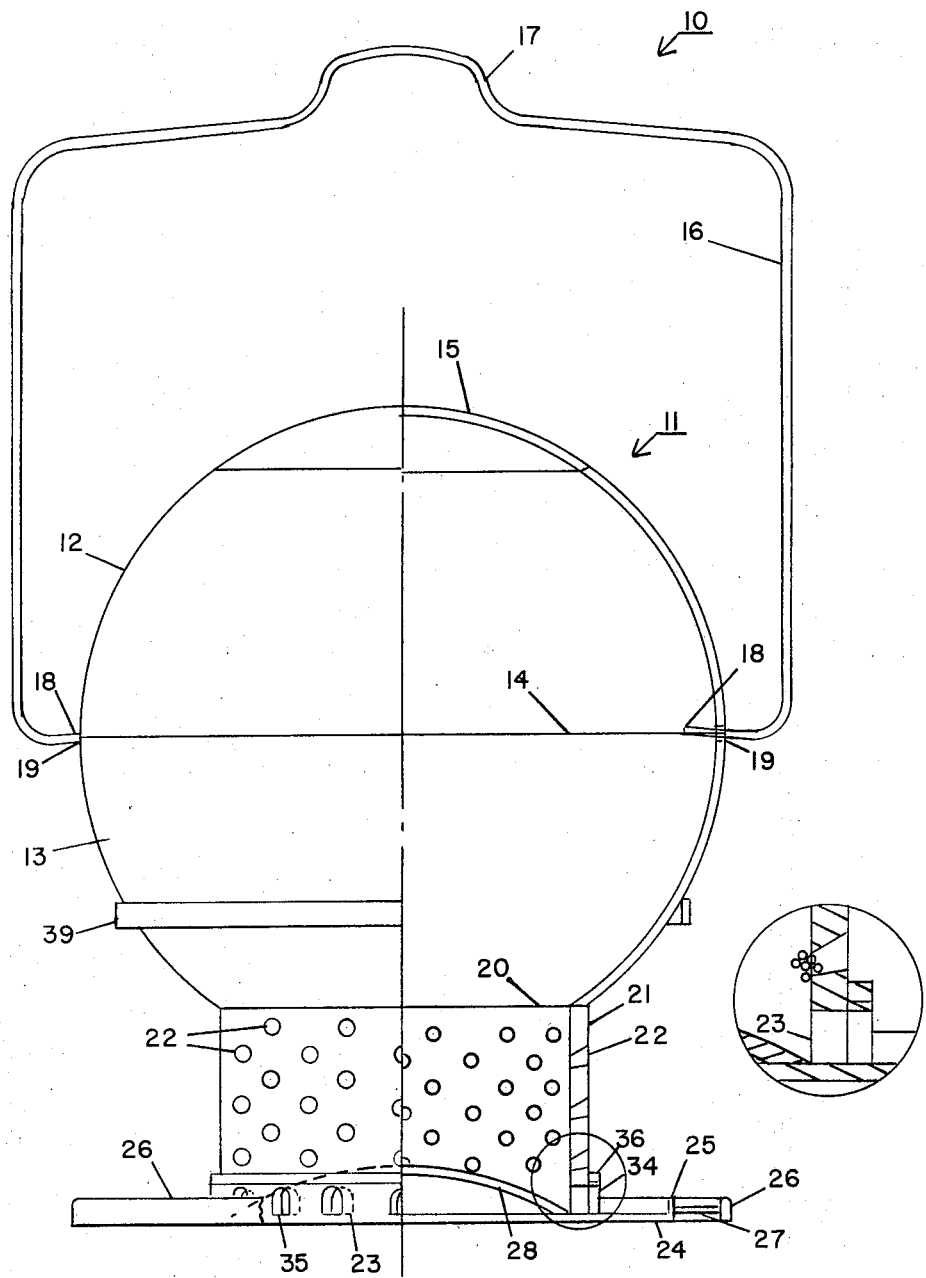
FIG. 1 is a partially cross-sectional elevational view of a preferred embodiment of the inventive feeder.

Feeder 10 of the drawings has a spherical container 11 preferably formed of transparent plastic in a pair of hemispheres 12 and 13 joined together along line 14. Container 11 holds a supply of birdseed that is visible from a distance, and container 11 is filled with birdseed through a top opening normally closed by cover 15. If the cut around the top opening is made on a bevel, cover 15 can be formed of the waste plug removed from the cut.

Container 11 is supported by a wire yoke 16 bent into a U shape as illustrated with a hanging loop 17, and with free ends 18 preferably bent upward as illustrated and inserted through diametrically opposed holes 19 in container 11. Container 11 then pivots freely about the horizontal axis between yoke ends 18, and this lets feeder 10 swing in the wind, and pivot unstably if a squirrel tries to crawl down over container 11 to the birdseed at the bottom. Yoke 16 interferes with a squirrel crawling directly over the pivot axis for container 11, and the weight of a squirrel in an off axis position tilts feeder 10 away from the squirrel as it crawls downward.

A bottom opening 20 is cut at the bottom center of container 11, and a pipe 21 is secured to container 11 around bottom opening 20 to extend downward from bottom opening 20 as illustrated. Pipe 21 is preferably formed of a cylinder of transparent plastic material. A plurality of peck holes 22 are bored through the wall of pipe 21, and holes 22 are preferably tapered inward and angled downward as illustrated so that birdseed will not spill out of holes 22, but small birds can reach into holes 22 and secure small seeds resting in the insides of holes 22. Pipe 21 also has bottom openings 23 that are preferably semicircular as illustrated. This allows a plurality of full circle holes to be bored in a double length of pipe 21 which is then cut in half to bisect the holes and form semi-circular holes 23 in two lengths of pipe 21 as illustrated.

A feed table 24 is secured to the bottom of pipe 21 and extends radially outward around pipe 21 to a raised rim 25. Seeds spilling out of bottom openings 23 are contained on feed table 24 by rim 25 which also serves as a perch for birds. Table 24 can be made of a circular plastic disk secured to the bottom of pipe 21 with rim 25 formed as a cylindrical plastic piece cut from a plastic pipe and secured to table disk 24. An additional perch rim 26 having a larger diameter than rim 25 can be secured around rim 25 by support 27 to afford a wider perch for larger birds if desired.

A waste plug 28 cut from bottom opening 20 of container 11 is inverted and secured over feed table 24 inside the bottom region of pipe 21 as illustrated to serve as a deflector guiding birdseed downward and outward toward bottom openings 23 of pipe 21. Alternatively, a conical or other shaped deflector can be inserted in the bottom region of pipe 21 to help guide birdseed out of oppnings 23.

Figure 3:
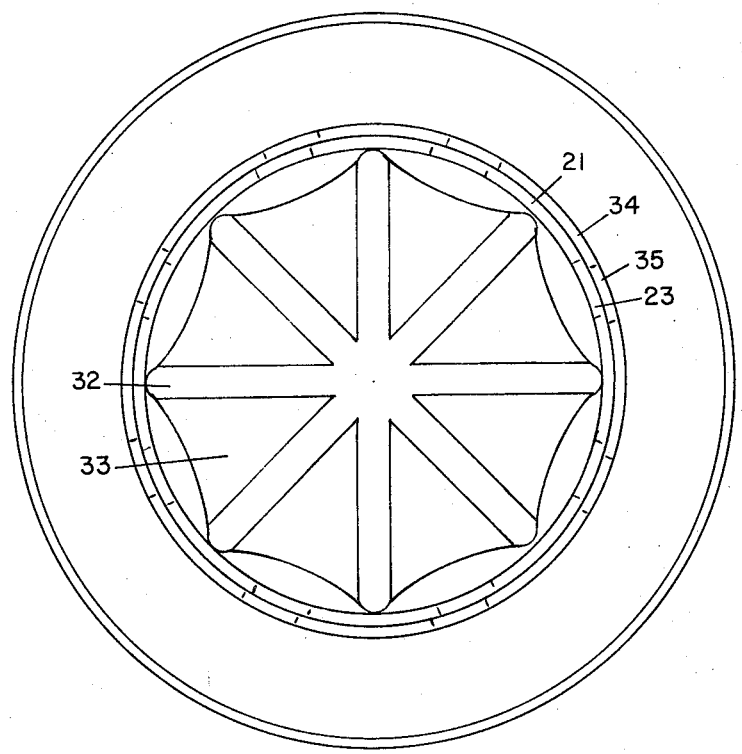
FIG. 3 is a plan view of an alternative preferred feeder table for the inventive bird feeder.
Figure 4:
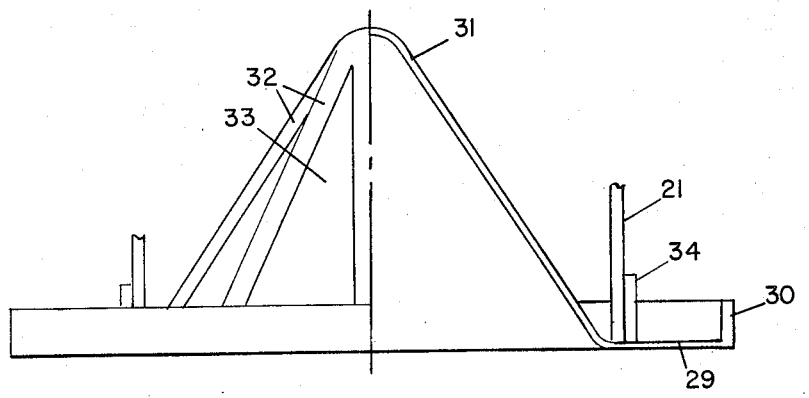
FIG. 4 is a partially cross-sectioned, elevational view of the feeder table of FIG. 3.

An alternative feed table 29 as shown in FIGS. 3 and 4 can be vacuum formed of plastic material to have a peripheral rim 30 and a raised central deflector 31 having ridges 32 and grooves 33 corresponding to bottom openings 23 of pipe 21. Feed table 29 then has a mating fit with the bottom of pipe 21 and is automatically centered under pipe 21 when table 29 is secured to the bottom of pipe 21. Grooves 33 preferably lead toward bottom openings 23 to guide birdeed out of openings 23.

To adjust the flow of birdseed through bottom openings 23, a ring 34 surrounds the outside of the bottom of pipe 21 and has openings 35 corresponding with openings 23. A fixed ring 36 is secured to pipe 21 to hold ring 34 in place, and ring 34 is rotatable around pipe 21 for adjusting the relationship between openings 23 and 35. Openings 35 of ring 34 are preferably semicircular in shape so that a pair of rings 34 can be formed by severing a length of pipe having circular holes as previously described for forming pipe 21.

Ring 34 can be rotationally adjusted to shut off openings 23, or fully open openings 23. Various adjustments depend upon weather conditions, the types of birds desired at the feeder, the types of seeds in the feeder, and squirrel problems. If bottom openings 23 are restricted or shut off by adjustment of ring 34, birdseed cannot be spilled out of feeder 10 by wind or squirrel activity, and feeding can be restricted to peck holes 22 if desired.

Figure 2:
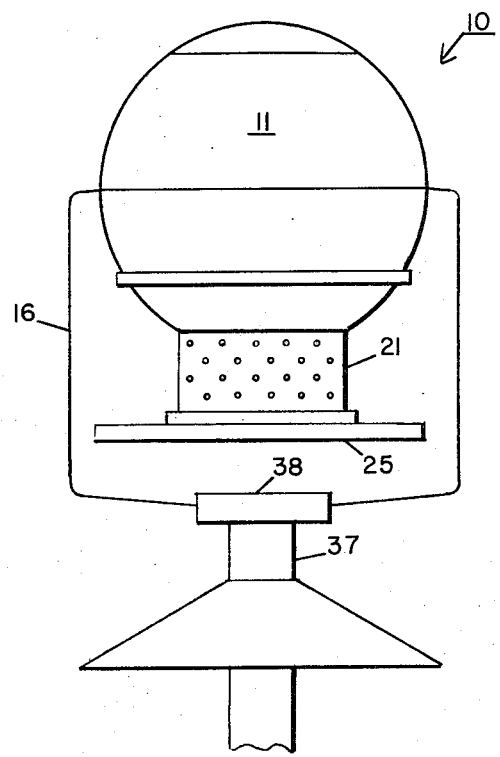
FIG. 2 is an elevational view of another preferred embodiment of the inventive feeder.

FIG. 2 shows feeder 10 mounted on a post 37 by a bracket 38 secured to yoke 16 which is preferably elongated to keep feeder 10 well above the top of post 37. Container 11 is still free to pivot within yoke 16, and the arrangement of FIG. 2 is preferred where there is no convenient way to hang feeder 10 from above as illustrated in FIG. 1.

The inventive feeder is economically made of simple plastic parts so as to be sturdy, weatherproof, and convenient to load and maintain. Hemispheres 12 and 13 are easily made by injection molding, yoke 16 is easily formed by bending a wire, and the remaining parts can be cut from plastic tubes or cylinders and the whole assembly secured together with solvent bonding. The alternative feed tray 29 can be vacuum formed relatively cheaply, and all the materials, cutting, and assembly are cheaper, simpler, and easier than most previously known bird feeders. Furthermore, feeder 10 is aesthetically attractive, serviceable, and its spherical container 11 holds a maximum amount of birdseed for the material used in the container wall. This allows container 11 to be made in reasonable sizes and still hold a surprisingly large quantity of birdseed so that it does not have to be refilled very often.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the materials, mounting brackets, assembly techniques, and part shapes and sizes possible within the spirit of the invention.

I claim:

1. A bird feeder comprising:
   a. a transparent plastic container for a supply of birdseed;
   b. a support yoke formed of a wire bent into a U-shape with the free ends of said wire inserted into opposed openings in the wall of said container to support said container for pivoting freely about a generally horizontal axis between said wire ends;
   c. said container having a circular bottom opening for dispensing said birdseed;
   d. a cylindrical plastic pipe extending downward from said container around said bottom opening;
   e. a circular plastic feed table secured to the bottom end of said pipe and extending radially outward around said pipe;
   f. the bottom region of said pipe having a plurality of openings above said feed table for dispensing said birdseed onto said feed table; and
   g. said free ends of said support yoke supporting said container just above the center of gravity of said feeder so said feeder is unstable if a squirrel tries to crawl down over said container.

2. The bird feeder of claim 1 including a rotatable plastic feed adjustment device around said bottom region of said pipe, said adjustment device having a plurality of openings corresponding to said pipe openings so rotational adjustment of said device adjusts the effective size of said pipe openings.

3. The bird feeder of claim 1 including a drip ring secured to the underside of said container and having a diameter larger than said pipe.

4. The bird feeder of claim 1 including a bracket for supporting said yoke in an upright position above the top of a post.

5. The bird feeder of claim 1 including a rotatable plastic feed adjustment device around said bottom region of said pipe, said adjustment device having a plurality of openings corresponding to said pipe openings so rotational adjustment of said device adjusts the effective size of said pipe openings, and including a deflector inside said bottom region of said pipe for directing said birdseed outward and downward toward said pipe openings.

6. The bird feeder of claim 5 wherein a drip ring is secured to the underside of said container and has a diameter larger than said pipe.

* * * * *